United States Patent
Zhang et al.

(10) Patent No.: US 11,743,636 B2
(45) Date of Patent: Aug. 29, 2023

(54) SPEAKER STRUCTURE AND DISPLAY DEVICE

(71) Applicant: ONEPLUS TECHNOLOGY (SHENZHEN) CO., LTD., Guangdong (CN)

(72) Inventors: Yong Zhang, Shenzhen (CN); Yajun Yu, Shenzhen (CN); Jin Hu, Shenzhen (CN); Yong Yang, Shenzhen (CN); Xiaodong Huang, Shenzhen (CN); Yuzhou Chen, Shenzhen (CN); Shunming Huang, Shenzhen (CN)

(73) Assignee: ONEPLUS TECHNOLOGY (SHENZHEN) CO., LTD., Guangdong (CN)

( * ) Notice: Subject to any disclaimer, the term of this patent is extended or adjusted under 35 U.S.C. 154(b) by 175 days.

(21) Appl. No.: 17/404,945

(22) Filed: Aug. 17, 2021

(65) Prior Publication Data
US 2021/0377655 A1   Dec. 2, 2021

Related U.S. Application Data

(63) Continuation of application No. PCT/CN2020/077527, filed on Mar. 3, 2020.

(30) Foreign Application Priority Data

Mar. 19, 2019  (CN) .......................... 201910210093.3

(51) Int. Cl.
*H04R 1/34*  (2006.01)
*G01D 5/34*  (2006.01)
(Continued)

(52) U.S. Cl.
CPC .............. *H04R 1/345* (2013.01); *G01D 5/34* (2013.01); *H04R 1/028* (2013.01); *H04R 1/403* (2013.01);
(Continued)

(58) Field of Classification Search
CPC ...... H04R 2499/15; H04R 1/34; H04R 1/345; H04R 1/028; H04R 1/403; H04R 3/12;
(Continued)

(56) References Cited

U.S. PATENT DOCUMENTS 7,702,123 B2   4/2010  Soerensen
10,091,577 B2 *  10/2018  Park .......................... H04R 5/02
(Continued)

FOREIGN PATENT DOCUMENTS

CN   102196341 A   9/2011
CN   103024321 A   4/2013
(Continued)

OTHER PUBLICATIONS

First Office Action of the Indian application No. 202117036057, dated Mar. 17, 2022.
(Continued)

*Primary Examiner* — Jason R Kurr
(74) *Attorney, Agent, or Firm* — Ladas & Parry, LLP

(57) ABSTRACT

A speaker structure comprises a main speaker, an auxiliary speaker, a first driving mechanism, and a second driving mechanism. The auxiliary speaker is connected to the main speaker and displaceable relative to the main speaker. The first drive mechanism is configured to drive the main speaker to reciprocate in a first direction, and the second driving mechanism is configured to drive the auxiliary speaker to reciprocate in a second direction relative to the main speaker. The first driving mechanism is arranged in the main speaker, and the second driving mechanism is arranged in the main speaker. An output end of the second driving mechanism extends out of the main speaker and connected to the auxiliary speaker.

20 Claims, 13 Drawing Sheets

(51) Int. Cl.
*H04R 1/02* (2006.01)
*H04R 1/40* (2006.01)
*H04R 3/12* (2006.01)

(52) U.S. Cl.
CPC ......... *H04R 3/12* (2013.01); *H04R 2201/025* (2013.01); *H04R 2201/401* (2013.01); *H04R 2400/11* (2013.01); *H04R 2499/15* (2013.01)

(58) Field of Classification Search
CPC ........ H04R 2201/025; H04R 2201/401; H04R 2400/11; G01D 5/34; H04N 5/642
See application file for complete search history.

(56) References Cited

U.S. PATENT DOCUMENTS

| | | | |
|---|---|---|---|
| 2004/0135476 A1* | 7/2004 | Gillengerten | H04R 5/02 312/7.2 |
| 2005/0146251 A1 | 7/2005 | Gillengerten | |
| 2007/0140508 A1 | 6/2007 | Soerensen | |
| 2007/0274547 A1* | 11/2007 | Ueno | H04R 5/02 381/388 |
| 2012/0308065 A1* | 12/2012 | Padalino | H04R 5/02 381/335 |
| 2013/0070944 A1 | 3/2013 | Lee | |
| 2014/0023220 A1* | 1/2014 | Ku | H04R 1/403 381/333 |
| 2018/0024588 A1* | 1/2018 | Han | G06F 1/1605 381/333 |
| 2018/0184182 A1* | 6/2018 | Hong | H04R 3/14 |

FOREIGN PATENT DOCUMENTS

| | | |
|---|---|---|
| CN | 203912075 U | 10/2014 |
| CN | 107040847 A | 8/2017 |
| CN | 109257555 A | 1/2019 |
| CN | 109264624 A | 1/2019 |
| CN | 109348153 A | 2/2019 |
| CN | 208479925 U | 2/2019 |
| CN | 109516406 A | 3/2019 |
| CN | 109889745 A | 6/2019 |
| CN | 110599933 A | 12/2019 |
| KR | 20010105090 A | 11/2001 |

OTHER PUBLICATIONS

Supplementary European Search Report in the European application No. 20772766.6, dated Feb. 16, 2022.

WIPO English translation of Written Opinion of the International Search Authority in the international application No. PCT/CN2020/077527 dated May 28, 2020 (previously, on Aug. 24, 2021, the Written Opinion and machine translation provided by Google were cited in an IDS).

International Search Report in the international application No. PCT/CN2020/077527, dated May 28, 2020.

First Office Action of the Chinese application No. 201910210093.3, dated Apr. 20, 2020.

Written Opinion of the International Searching Authority in International Application No. PCT/CN2020/077527, dated May 28, 2020 with English translation provided by Google Translate.

* cited by examiner

This is a continuation application of International Patent Application No. PCT/CN2020/077527, filed on Mar. 3, 2020, which claims priority to Chinese Patent Application No. 201910210093.3, filed on Mar. 19, 2019. The disclosures of these applications are incorporated by reference herein in their entireties.

SPEAKER STRUCTURE AND DISPLAY DEVICE

CROSS-REFERENCE TO RELATED APPLICATIONS

TECHNICAL FIELD

The disclosure relates to the technical field of display devices, and in particular to a speaker structure and a display device.

BACKGROUND

At present, the sound emission of a speaker of a television generally includes three solutions: forward sound emission, downward sound emission and backward sound emission. The solution with the best sound quality is forward sound emission, the solution with the medium sound quality is downward sound emission, and the solution with the worst sound quality is backward sound emission. In order to pursue a good sound quality effect, it is generally necessary for a television to emit sound forwardly. However, in the solution of forward sound emission, the speaker needs to occupy a relatively large space under the screen, so that it is impossible to obtain a television with a concise appearance.

For this purpose, there have been some solutions in existing related products that can adjust the sound emission direction by changing the position of the speaker. These solutions generally focus on the following two types.

1. The up-and-down movement type, a speaker of this type is installed in a rear housing of a television, and this speaker is driven to move upward and downward to realize forward sound emission.

2. The combined movement type, a speaker of this type is also installed in a rear housing of a television, and this speaker is driven to move upward and downward firstly, and then this speaker is driven to move obliquely or move forward to realize forward sound emission.

In the first type described above, the appearance effect is poor due to the fact that a relatively large distance exists between the protruding speaker and the display surface of the display screen. In the second type described above, although the speaker may be driven to be flush with the display surface, a driving mechanism needs to complete two types of movement, so that the size of the driving mechanism is relatively large. This kind of driving mechanism needs to be arranged in the whole machine. In order to accommodate the driving mechanism, the upper half of the whole television is large in size, so that the appearance is not concise and attractive. Moreover, after the speaker is moved away, the original space where the speaker is located becomes an empty space. The fingers may be inserted into the empty space, or foreign matters can easily enter the empty space, so that it is unsafe and unreliable.

SUMMARY

The disclosure aims at least to some extent to solve one of the technical problems in the related art.

For this purpose, according to a first aspect, in an embodiment, a speaker structure is provided. The speaker structure includes:

a main speaker;

an auxiliary speaker connected to the main speaker and displaceable relative to the main speaker;

a first driving mechanism configured to drive the main speaker to reciprocate in a first direction; and a second driving mechanism configured to drive the auxiliary speaker to reciprocate in a second direction relative to the main speaker, in which the first driving mechanism is arranged in the main speaker, the second driving mechanism is arranged in the main speaker, and an output end of the second driving mechanism extends out of the main speaker and is connected to the auxiliary speaker.

As a further alternative solution of the speaker structure, the first direction is a vertical direction, and the second direction is a horizontal direction.

As a further alternative solution of the speaker structure, the first driving mechanism is arranged in parallel to the second driving mechanism.

As a further alternative solution of the speaker structure, the main speaker includes a main housing and a sound emission unit, the main housing defines a main cavity, and the sound emission unit of the main speaker is arranged in the main cavity.

As a further alternative solution of the speaker structure, the main speaker further includes a support provided with a limiting groove oriented in the first direction. The support is fixedly installed in the main housing and forms an installation cavity with the main housing. The first driving mechanism includes a limiting member and a first driving assembly. One side of the limiting member passes through the main housing and is fixedly installed to the main housing, and another side of the limiting member is provided with a protrusion matched with the limiting groove. The first driving assembly is installed in the installation cavity, and the first driving assembly is arranged in the first direction and is configured to output a rotary movement. The limiting member is installed at an output end of the first driving assembly, and the limiting member is movable along the limiting groove relative to the support through a relative rotation of the limiting member and the first driving assembly.

As a further alternative solution of the speaker structure, the first driving assembly includes a first driving motor, a gear assembly and a lead screw. The first driving motor is arranged in parallel to the lead screw. The gear assembly is connected to respective ends of the first driving motor and the lead screw. The limiting member is arranged around the lead screw.

As a further alternative solution of the speaker structure, the main speaker further includes a first light blocking member, a first control panel, a first position sensor, a second position sensor and a third position sensor. The first position sensor, the second position sensor and the third position sensor are arranged on the first control panel. The first light blocking member is fixedly connected to the limiting member. The first control panel is fixedly installed on the main housing. The first position sensor, the second position sensor and the third position sensor are spaced apart from each other in the first direction. Each of the first position sensor and the second position sensor cooperates with the first light blocking member to limit an extreme position of the support, and the third position sensor is arranged between the first position sensor and the second position sensor and adjacent to the second position sensor.

As a further alternative solution of the speaker structure, the auxiliary speaker includes an auxiliary housing and a sound emission unit. The auxiliary housing defines an auxiliary cavity, and the sound emission unit of the auxiliary speaker is arranged in the auxiliary cavity. The second driving mechanism includes a second driving motor and a gear-rack assembly. The second driving motor is arranged in the main cavity, and an output end of the second driving motor extends into the auxiliary cavity and is connected to the gear-rack assembly, and a rack in the gear-rack assembly is arranged in the second direction.

As a further alternative solution of the speaker structure, the auxiliary speaker further includes at least three sets of guide assemblies. The at least three sets of guide assemblies are arranged in the auxiliary cavity, arranged in a length direction of the auxiliary cavity and uniformly spaced apart from each other.

According to a second aspect, in an embodiment, a display device is provided. The display device includes a display screen and a speaker structure. A receiving cavity is formed in a rear surface of the display screen. The speaker structure is installed in the receiving cavity. A first driving mechanism drives a main speaker and an auxiliary speaker of the speaker structure to reciprocate in a vertical direction. A second driving mechanism drives the auxiliary speaker of the speaker structure to reciprocate in a horizontal direction.

BRIEF DESCRIPTION OF THE DRAWINGS

In order to illustrate the technical solutions in the embodiments of the disclosure more clearly, the drawings required to be used in the embodiments will be described briefly below. It is to be understood that the drawings described below are merely illustrative of some embodiments of the disclosure, and therefore should not to be considered as limiting its scope. It will be understood by those of ordinary skill in the art that other relevant drawings can also be obtained from these drawings without any creative effort.

DETAILED DESCRIPTION

Figure 1:
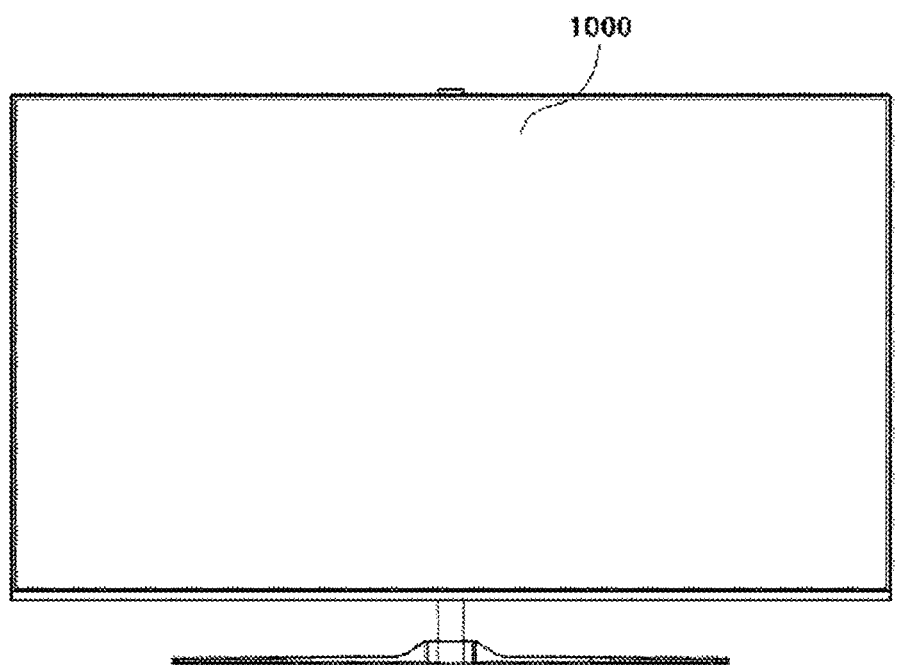
FIG. 1 illustrates a front schematic diagram of a display device in a powered-off state according to an embodiment of the disclosure.
Figure 2:
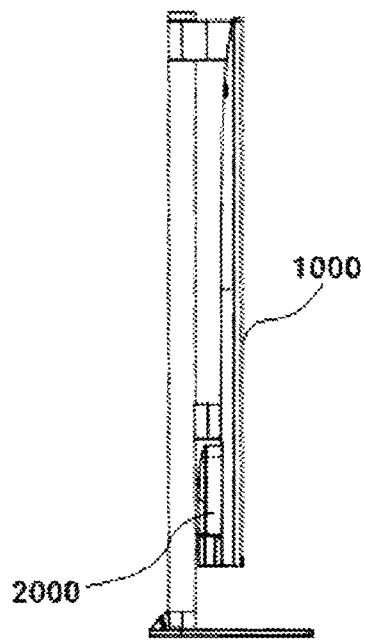
FIG. 2 illustrates a side schematic diagram of a display device in a powered-off state according to an embodiment of the disclosure.
Figure 3:
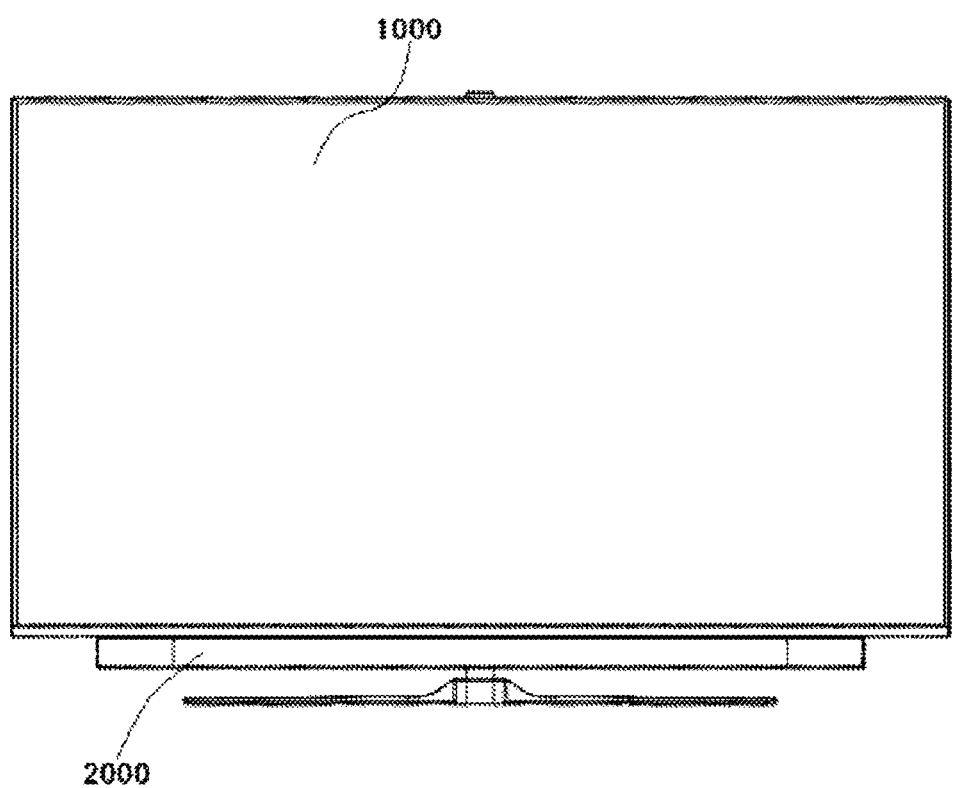
FIG. 3 illustrates a front schematic diagram of a display device in a powered-on state according to an embodiment of the disclosure.
Figure 4:
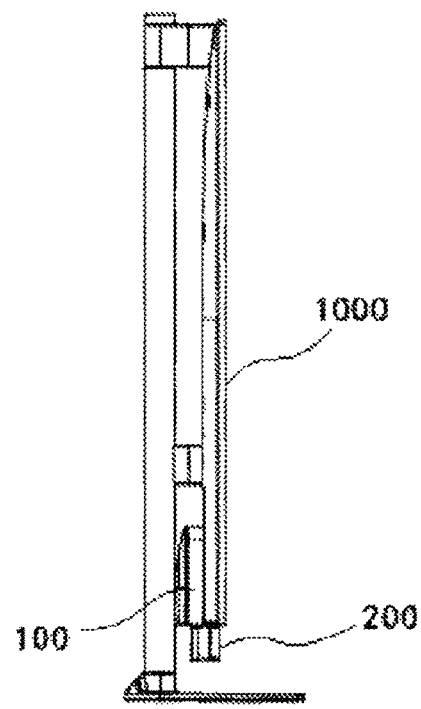
FIG. 4 illustrates a side schematic diagram of a display device in a powered-on state according to an embodiment of the disclosure.

The embodiments of the disclosure will be described in detail below. Examples of the embodiments are illustrated in the accompanying drawings, in which the same or similar reference numerals are used to designate same or similar elements or elements with same or similar functions. The following embodiments described with reference to the accompanying drawings are illustrative and intended to explain the disclosure, but may not to be interpreted as the restrictions of the disclosure.

In the description of the disclosure, it is to be understood that orientation or position relationships indicated by terms 'central', 'longitudinal', 'transverse', 'length', 'width', 'thickness', 'upper', 'lower', 'front', 'rear', 'left', 'right', 'vertical', 'horizontal', 'top', 'bottom', 'inner', 'outer', 'clockwise', 'counterclockwise', 'axial', 'radial', 'circumferential', and the like are orientation or position relationships shown in the drawings, are adopted not to indicate or imply that indicated devices or components must be in specific orientations or structured and operated in specific orientations but only to conveniently describe the disclosure and simplify the description, and are not be construed as limiting the disclosure.

In addition, terms 'first' and 'second' are only adopted for description and should not be understood to indicate or imply relative importance or to implicitly indicate the number of indicated technical features. Therefore, a feature defined by 'first' and 'second' may explicitly or implicitly indicate inclusion of at least one such feature. In the description of the disclosure, 'multiple' means two or more, unless otherwise limited definitely and specifically.

In the disclosure, unless otherwise definitely specified and limited, terms 'install', 'mutually connect', 'connect', 'fix' and the like should be broadly understood. For example, the terms may refer to fixed connection and may also refer to detachable connection or integration. The terms may refer to mechanical connection and may also refer to electrical connection. The terms may refer to direct mutual connection, may also refer to indirect connection through a medium and may refer to communication in two components or an interaction relationship of the two components. For those of ordinary skill in the art, specific meanings of these terms in the disclosure can be understood according to a specific condition.

In the disclosure, unless otherwise specified and defined explicitly, a first feature being 'above' or 'below' a second feature may include the first feature and the second feature being in direct contact, or the first feature and the second feature being in contact through an intermediary. Moreover, the first feature being 'on', 'above' and 'over' the second feature may be that the first feature is right above or not right above the second feature, or merely means that the level of the first feature is higher than that of the second feature. The first feature being 'under', 'below', and 'beneath' the second feature may be that the first feature is directly below or not directly below the second feature, or merely means that the level of the first feature being lower than that of the second feature.

Embodiment

This embodiment provides a display device.

Referring to FIGS. 1-5, the display device includes a display screen 1000 and a speaker structure 2000. A receiving cavity 1100 is provided in the rear surface of the display screen 1000. The speaker structure 2000 is installed in the receiving cavity 1100. The speaker structure 2000 may reciprocate in a vertical direction and a horizontal direction in the receiving cavity 1100, so that the speaker structure 2000 is finally located directly below the display screen 1000 and is flush with a display surface of the display screen 1000.

Figure 6:
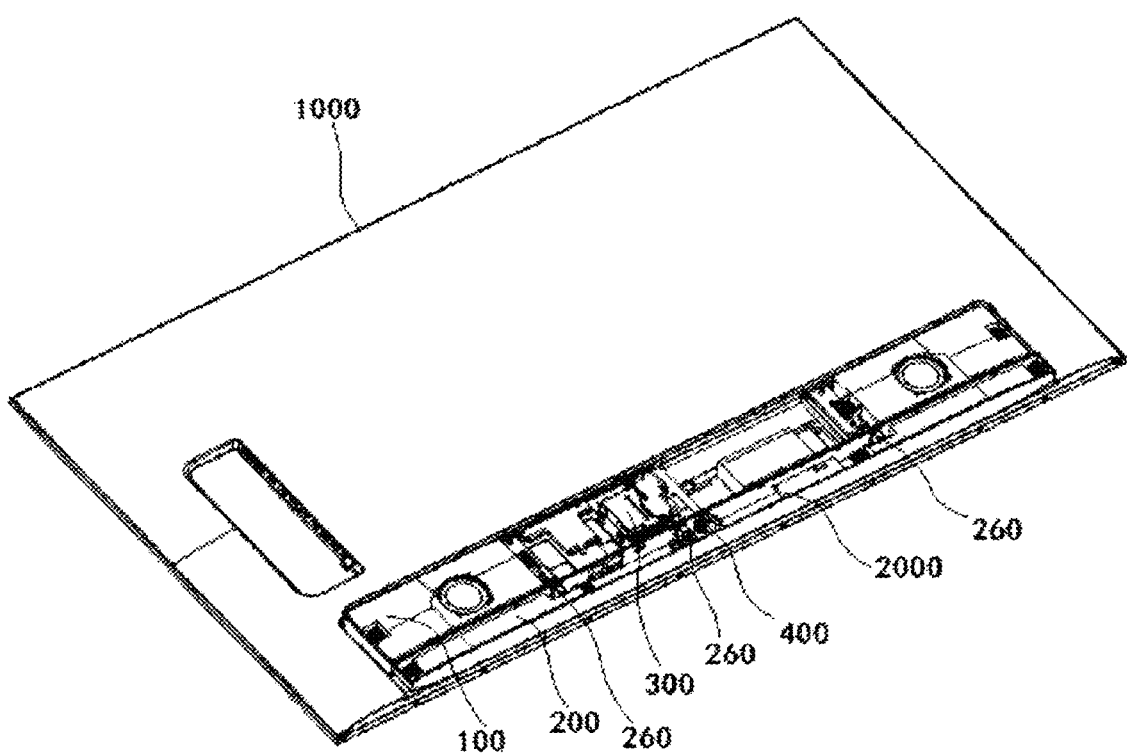
FIG. 6 illustrates a schematic diagram of an installation of a display device in a powered-off state according to an embodiment of the disclosure.
Figure 7:
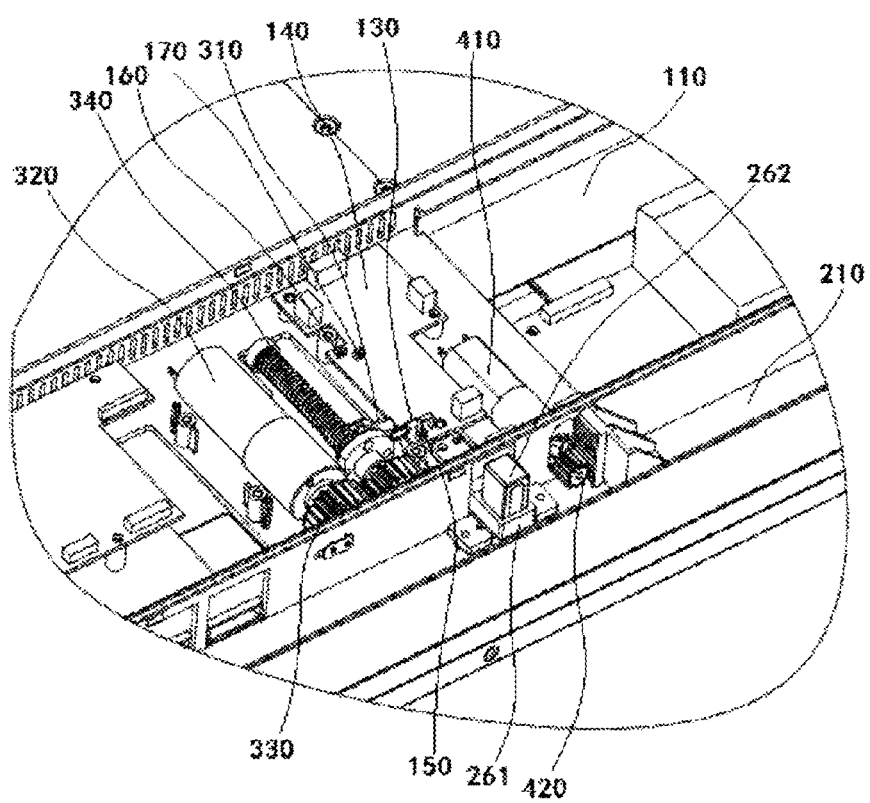
FIG. 7 illustrates a partially enlarged schematic diagram of FIG. 6.
Figure 8:
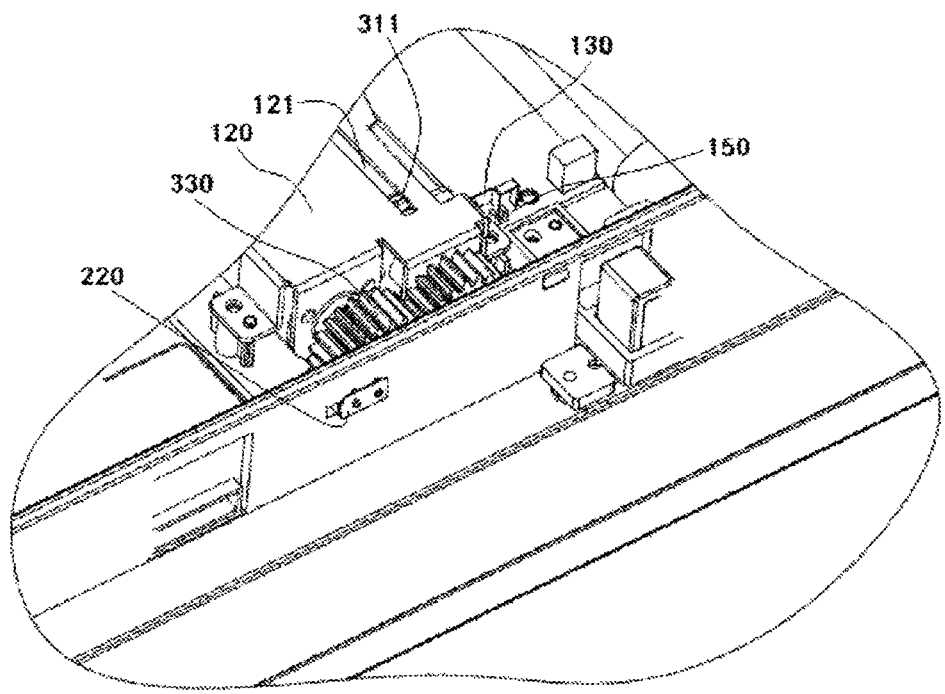
FIG. 8 illustrates another partially enlarged schematic diagram of FIG. 6.

Referring to FIGS. 6-8, the speaker structure 2000 includes a main speaker 100, an auxiliary speaker 200, a first driving mechanism 300 and a second driving mechanism 400.

The auxiliary speaker 200 is connected to the main speaker 100 in a manner that the auxiliary speaker may displace relative to the main speaker 100. The first driving mechanism 300 is configured to drive the main speaker 100 to reciprocate in a first direction. The second driving mechanism 400 is configured to drive the auxiliary speaker 200 to reciprocate in a second direction relative to the main speaker 100. The first driving mechanism 300 is arranged in the main speaker 100. The second driving mechanism 400 is arranged in the main speaker 100, and an output end of the second driving mechanism 400 extends out of the main speaker 100. The auxiliary speaker 200 is connected to the output end of the second driving mechanism.

Therefore, the speaker structure 20000 includes the main speaker 100 and the auxiliary speaker 200, and the auxiliary speaker 200 is connected to the main speaker 100 in a manner that the auxiliary speaker may displace relative to the main speaker 100, so that the main speaker 100 and the auxiliary speaker 200 may be simultaneously driven to reciprocate in the first direction by the first driving mechanism 300, and the auxiliary speaker 200 may be driven to reciprocate in the second direction by the second driving mechanism 400. The auxiliary speaker 200 may be finally flush with the display surface of the display device by combining the two movement directions described above, which ensures the appearance effect of the display device. Moreover, each of the first driving mechanism 300 and the second driving mechanism 400 only needs to complete reciprocation in one direction, so that the first driving mechanism 300 and the second driving mechanism 400 are smaller and more compact in structure and do not need to occupy a larger installation space. Therefore, the first driving mechanism 300 and the second driving mechanism 400 may be both arranged in the main speaker 100. In this case, the first driving mechanism 300 and the second driving mechanism 400 may form a modular design with the main speaker 100 and the auxiliary speaker 200 in structure, thereby facilitating installation and maintenance, and further improving the appearance effect.

It should be noted that the speaker structure 2000 in the implementation of the disclosure may be applied to a display device such as a television. In this case, the first direction may be understood as a vertical direction, and the second direction may be understood as a horizontal direction. In addition, the speaker structure 2000 may also be used independently. For example, the speaker structure may be used in some occasions where only sound emission is needed. When sound emission is not needed, the speaker structure 2000 is hidden and stored. When sound emission is needed, the speaker structure 2000 is extended out to emit sound forward.

The disclosure mainly describes the application of the speaker structure 2000 in the display device. That is, in the following related description, the first direction may be understood as the vertical direction, and the second direction may be understood as the horizontal direction.

In addition, in some embodiments, the first driving mechanism 300 is arranged in parallel to the second driving mechanism 400, so that the space of the main speaker 100 may be further utilized reasonably, thereby further improving the appearance effect of the whole display device. In order to enable the first driving mechanism 300 to be arranged in parallel to the second driving mechanism 400, the first driving mechanism 300 and the second driving mechanism 400 may adopt the following exemplary structures. However, it should be understood that the first driving mechanism 300 and the second driving mechanism 400 are not limited to the following exemplary structures.

Referring to FIG. 7, in an embodiment, the main speaker 100 includes a main housing 110 and a sound emission unit. The main housing 110 defines a main cavity, and the sound emission unit is arranged in the main cavity.

The sound emission unit may be realized by any of the existing components. For example, the sound emission unit may be a horn, a loudspeaker, or a combination of the horn and the loudspeaker.

Figure 9:
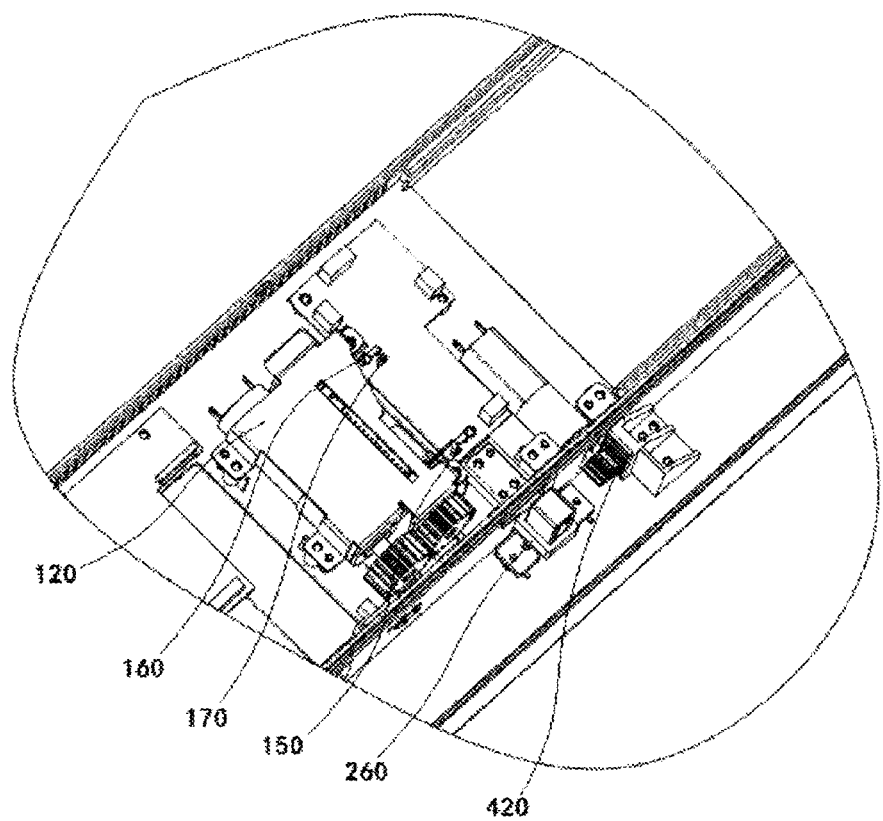
FIG. 9 illustrates still another partially enlarged schematic diagram of FIG. 6.

Referring to FIGS. 7-9, the main speaker 100 further includes a support 120 provided with a limiting groove 121 oriented in the first direction. The support 120 is fixedly installed in the main housing 110, and forms an installation cavity with the main housing 110. The first driving mechanism 300 includes a limiting member 310 and a first driving assembly. One side of the limiting member 310 passes through the main housing 110 and is fixedly installed to the main housing, and another side of the limiting member is provided with a protrusion 311 matched with the limiting groove 121. The first driving assembly is installed in the installation cavity, and the first driving assembly is arranged in the first direction and may output a rotary movement. The limiting member 310 is installed at an output end of the first driving assembly, and the limiting member is movable along the limiting groove 121 relative to the support 120 through a relative rotation of the limiting member and the first driving assembly.

It should be understood that in the installing relationship described above, one side of the limiting member 310 is fixedly arranged, that is, the relative movement between the limiting member 310 and the support 120 essentially refers to the movement of the support 120. Specifically, the support 120 is fixedly installed in the main housing 110, and the first driving assembly is installed on the support 120. In this case, the support 120, the first driving assembly and the main housing 110 may move together. The limiting member 310 is installed at the output end of the first driving assembly which can output the rotary movement. Ideally, the limiting member 310 should rotate following the rotary movement of the first driving assembly. However, due to the fact that the limiting member 310 is limited by the limiting groove 121 in the circumferential direction, the first driving assembly may move in the first direction relative to the limiting member 310, so that the support 120 and the main housing 110 may move together along with the first driving assembly. Therefore, the main speaker 100 and the auxiliary speaker 200 may move in the vertical direction relative to the display screen 1000.

More specifically, the first driving assembly includes a first driving motor 320, a gear assembly 330 and a lead screw 340. The first driving motor 320 is arranged in parallel to the lead screw 340, the gear assembly 330 is connected to a respective end of the first driving motor 320 and the lead screw 340, and the limiting member 310 is arranged around the lead screw 340.

In this case, it can be known that when the first driving motor 320 is activated to rotate forward (or rotate in reverse), the first driving motor 320 may drive the lead screw 340 into rotation through the gear assembly 330. Due to the fact that the limiting member 310 is fixedly arranged, the lead screw 340 may displace relative to the limiting member 310 during the rotation, so that the whole first driving assembly may finally move. When the first driving motor 320 is activated to rotate in reverse (or rotate forward), the first driving assembly may move reversely, so that the main speaker 100 and the auxiliary speaker 200 may reciprocate in the first direction.

In order to specify the movement routes of the main speaker 100 and the auxiliary speaker 200 in the first direction, the main speaker 100 also includes a first light blocking member 130, a first control panel 140, as well as a first position sensor 150 and a second position sensor 160 which are arranged on the first control panel 140. The first light blocking member 130 is fixedly connected to the limiting member 310. The first control panel 140 is fixedly installed on the main housing 110. The first position sensor 150 and the second position sensor 160 are spaced apart from each other in the first direction, and each of the first position sensor 150 and the second position sensor 160 cooperates with the first light blocking member 130 to limit the extreme position of the support 120 (or the main housing 110 and the first control panel 140), so that the extreme positions of the main speaker 100 and the auxiliary speaker 200 are limited.

Due to the fact that the first control panel 140 is fixedly installed on the main housing 110, in this case, the first control panel 140 may move along with the main housing 110. During the movement of the first control panel 140, the first position sensor 150 and the second position sensor 160 may be alternately blocked by the first light blocking member 130, so that the first position sensor 150 and the second position sensor 160 send signals respectively, so as to control the extreme position of the first control panel 140, and therefore the extreme positions of the main housing 110, the support 120 and even the main speaker 100 and the auxiliary speaker 200.

In the embodiment of the disclosure, the first position sensor 150 is arranged below the second position sensor 160. When the main speaker 100 and the auxiliary speaker 200 do not move in the first direction, the first light blocking member 130 is located in a lowermost portion of the lead screw 340 and corresponds to the first position sensor 150. In this case, the display device is in a powered-off state. Once the display device is turned on to generate a powered-on signal, the first driving motor 320 starts to operate, so that the lead screw 340 moves downward until the first light blocking member 130 moves to a position corresponding to the second position sensor 160. Then the auxiliary speaker 200 is driven to move in the second direction by the second driving mechanism 400, so that the auxiliary speaker 200 is finally located directly below the display screen 1000, and is flush with the display surface of the display screen 1000.

Figure 10:
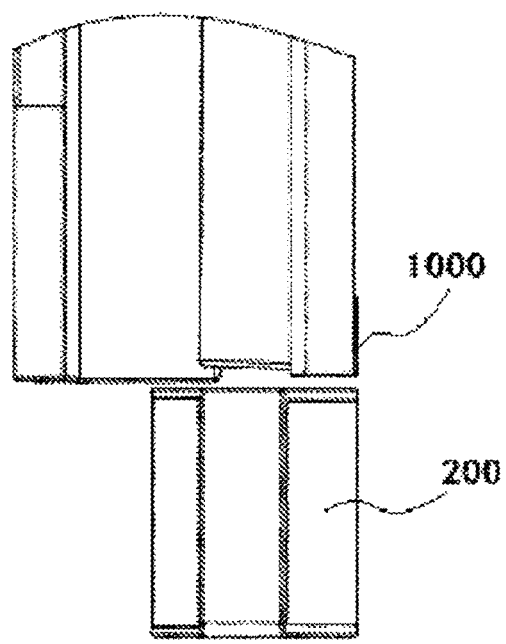
FIG. 10 illustrates a schematic diagram of a positional relationship between an auxiliary speaker of a speaker structure and a display screen according to an embodiment of the disclosure.
Figure 11:
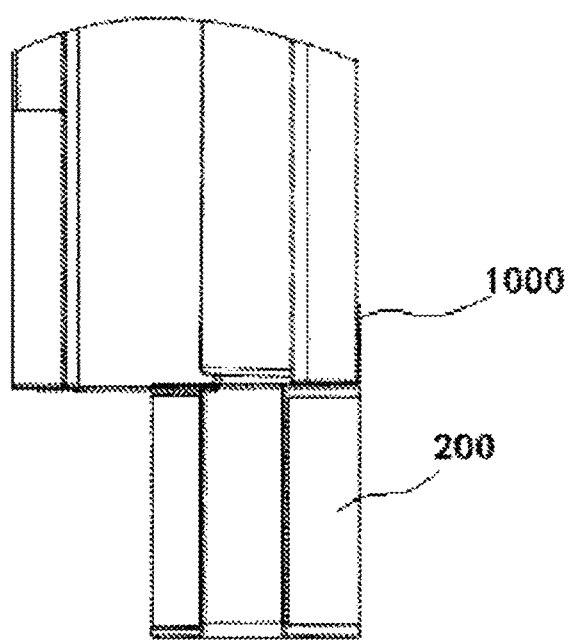
FIG. 11 illustrates another schematic diagram of a positional relationship between an auxiliary speaker and a display screen according to an embodiment of the disclosure.

In order to avoid interference with the movement of the auxiliary speaker 200, the main speaker 100 preferably moves beyond the lowermost portion of the display screen 1000 under the driving of the first driving mechanism 300, so that a certain gap is formed between the auxiliary speaker 200 and the display screen 1000 (as shown in FIG. 10). However, in order to improve the appearance effect of the display device, the gap should be eliminated after the auxiliary speaker 200 moves into position (as shown in FIG. 11).

Figure 12:
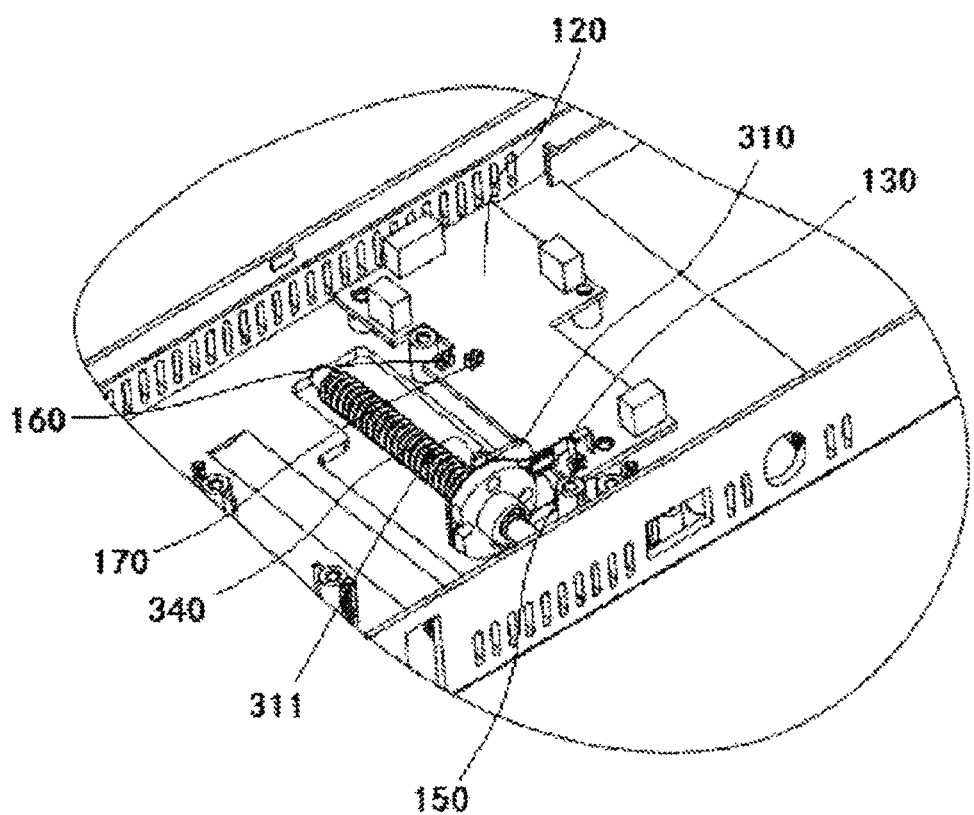
FIG. 12 illustrates yet another partially enlarged schematic diagram of FIG. 6.

In this regard, with reference to FIG. 12, in the disclosure, a third position sensor 170 is also provided between the first position sensor 150 and the second position sensor 160. The third position sensor 170 is arranged adjacent to the second position sensor 160, and the distance between the third position sensor 170 and the second position sensor 160 corresponds to the gap described above.

In this case, after it is detected that the auxiliary speaker 200 has moved into position, the first driving motor 320 rotates in reverse, so that the first light blocking member 130 moves to a position corresponding to the third position sensor 170. In this case, the main speaker 100 and the auxiliary speaker 200 move upward by a certain distance, thereby eliminating the gap between the auxiliary speaker 200 and the display screen 1000.

Referring to FIGS. 6-7, in an embodiment, the auxiliary speaker 200 includes an auxiliary housing 210 and a sound emission unit. The auxiliary housing 210 d an auxiliary cavity. The sound emission unit is arranged in the auxiliary cavity. The second driving mechanism 400 includes a second driving motor 410 and a gear-rack assembly 420. The second driving motor 410 is arranged in the main cavity, and the output end of the second driving motor extends into the auxiliary cavity. The gear-rack assembly 420 is connected to the output end of the second driving motor 410, and a rack in the gear-rack assembly 420 is arranged in the second direction.

When the first driving mechanism 300 drives the main speaker 100 and the auxiliary speaker 200 to move to a position where the first light blocking member 130 corresponds to the second position sensor 160, the second driving motor 410 in the second driving mechanism 400 may start to operate, so that the gear-rack assembly 420 may operate. In this case, the second driving motor 410 is fixed in the first direction, and the rack is arranged in the second direction, so that the rack may move in the second direction relative to the gear. The rack in the gear-rack assembly 420 is fixedly connected to the auxiliary housing 210, so that the auxiliary speaker 200 finally moves in the second direction.

Figure 13:
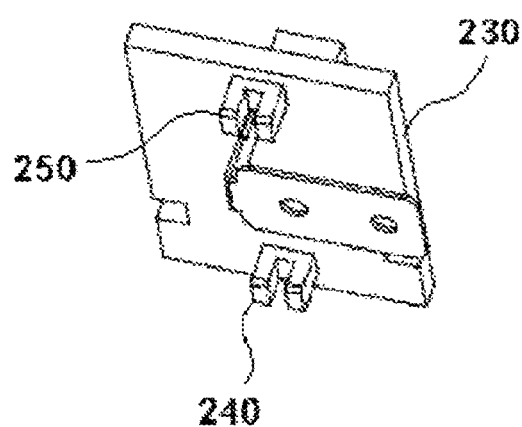
FIG. 13 illustrates a schematic diagram of an arrangement of a fourth position sensor and a fifth position sensor of an auxiliary speaker according to an embodiment of the disclosure.

Referring to FIG. 7 and FIG. 13, in order to specify the movement route of the auxiliary speaker 200 in the second direction, the auxiliary speaker 200 further includes a second light blocking member 220, a second control panel 230, as well as a fourth position sensor 240 and a fifth position sensor 250 which are arranged on the second control panel 230. The second control panel 230 is arranged on the outer wall of the main housing 110. The fourth position sensor 240 and the fifth position sensor 250 are spaced apart from each other in the second direction. In this case, the extreme position of the auxiliary speaker 200 in the second direction may be limited through the cooperation of each of the fourth position sensor 240 and the fifth position sensor 250 with the second light blocking member 220.

Furthermore, referring to FIGS. 6-7, the auxiliary speaker 200 may further include at least three sets of guide assemblies 260. The at least three sets of guide assemblies 260 are arranged in the auxiliary cavity, arranged in the length direction of the auxiliary cavity and uniformly spaced apart from each other.

Specifically, each guide assembly 260 includes a guide sleeve 261 fixedly installed on the side wall of the main housing 110, and a guide post 262 fixedly installed on the auxiliary housing 210. The guide post 262 may be inserted into the guide sleeve 261. In this case, when the auxiliary speaker 200 moves in the second direction, the meshing effect the gear-rack assembly 420 may be well guaranteed due to the cooperation between the guide post 262 and the guide sleeve 261, so that the auxiliary speaker 200 may stably move.

More specifically, the matching gap between the guide post 262 and the guide sleeve 261 at the middle position is relatively small, while the matching gap between the guide post 262 and the guide sleeve 261 at both ends is relatively large. Due to the arrangement of the three sets of guide assemblies 260, on one hand, the meshing effect of the gear-rack assembly 420 may be ensured, and on the other hand, the shaking of the auxiliary speaker 200 during the movement may also be controlled.

Figure 5:
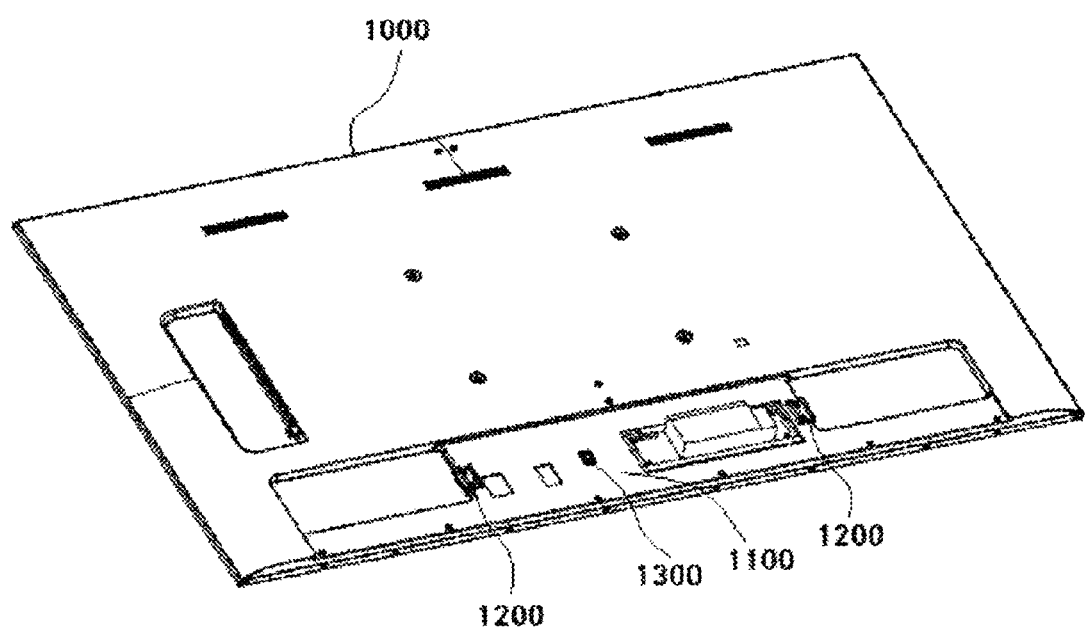
FIG. 5 illustrates a rear schematic diagram of a display device according to an embodiment of the disclosure.

In addition to the above description, referring to FIG. 5, in order to ensure the stability of the movement of the speaker structure 2000, a pair of guide rails 1200 is also provided in the receiving cavity 1100. Moreover, in order to facilitate the fixed installation of one side of the limiting member 310, a fixed installing position 1300 is also provided in the receiving cavity 1100. One side of the limiting member 310 may pass through the main housing 110 to be fixedly installed at the fixed installing position 1300.

The beneficial effects of the disclosure are described as follows.

According to the speaker structure and the display device in the above embodiments, the speaker structure includes a main speaker and an auxiliary speaker, and the auxiliary speaker is connected to the main speaker and displaceable relative to the main speaker, so that the main speaker and the auxiliary speaker may be simultaneously driven to reciprocate in the first direction by the first driving mechanism, and the auxiliary speaker may be driven to reciprocate in the second direction by the second driving mechanism. The auxiliary speaker may be finally flush with the display surface of the display device by combining the two movement directions, which ensures the appearance effect of the display device. Meanwhile, each of the first driving mechanism and the second driving mechanism only needs to complete a reciprocation in one direction, so that the first driving mechanism and the second driving mechanism are smaller and more compact in structure and do not need to occupy a larger installation space. Therefore, the first driving mechanism and the second driving mechanism may be both arranged in the main speaker. In this case, the first driving mechanism and the second driving mechanism may form a modular design with the main speaker and the auxiliary speaker in structure, thereby facilitating installation and maintenance, and further improving the appearance effect.

In the description of the specification, the descriptions made to terms 'an embodiment', 'some embodiments', 'an example', 'a specific example', 'some examples' or the like means that specific features, structures, materials or characteristics described in combination with the embodiment or the example are included in at least one embodiment or example of the disclosure. In the specification, the schematic expressions of the above terms are not necessarily directed to the same embodiment or example. Moreover, the specific features, structures, materials or characteristics described may be combined in a proper manner in any one or more embodiments or examples. In addition, those skilled in the art may incorporate and combine different embodiments or examples and features of the different embodiments or examples described in the specification without contradiction.

Although the embodiments of the disclosure have been shown and described above, it should be understood that the above embodiments are exemplary, and will not be understood as the limitation to the disclosure. Alterations, modifications, substitutions and variations to the above embodiments may be made by those of ordinary skill in the art within the scope of the disclosure.

The invention claimed is:

1. A speaker structure, comprising:
a main speaker;
an auxiliary speaker connected to the main speaker and displaceable relative to the main speaker;
a first driving mechanism configured to simultaneously drive the main speaker and the auxiliary speaker to reciprocate in a first direction; and
a second driving mechanism configured to drive the auxiliary speaker to reciprocate in a second direction relative to the main speaker, wherein the first driving mechanism is arranged in the main speaker, the second driving mechanism is arranged in the main speaker, and an output end of the second driving mechanism extends out of the main speaker and is connected to the auxiliary speaker.

2. The speaker structure according to claim 1, wherein the first direction is a vertical direction, and the second direction is a horizontal direction.

3. The speaker structure according to claim 1, wherein the first driving mechanism is arranged in parallel to the second driving mechanism.

4. The speaker structure according to claim 1, wherein the main speaker comprises a main housing and a sound emission unit, the main housing defines a main cavity, and the sound emission unit of the main speaker is arranged in the main cavity.

5. The speaker structure according to claim 2, wherein the main speaker comprises a main housing and a sound emission unit, the main housing defines a main cavity, and the sound emission unit of the main speaker is arranged in the main cavity.

6. The speaker structure according to claim 3, wherein the main speaker comprises a main housing and a sound emission unit, the main housing defines a main cavity, and the sound emission unit of the main speaker is arranged in the main cavity.

7. The speaker structure according to claim 4, wherein the main speaker further comprises a support provided with a limiting groove oriented in the first direction, the support is fixedly installed in the main housing and forms an installation cavity with the main housing, the first driving mechanism comprises a limiting member and a first driving assembly, one side of the limiting member passes through the main housing and is fixedly installed to the main housing, another side of the limiting member is provided with a protrusion matched with the limiting groove, the first driving assembly is installed in the installation cavity, the first driving assembly is arranged in the first direction and is configured to output a rotary movement, the limiting member is installed at an output end of the first driving assembly, and the limiting member is movable along the limiting groove relative to the support through a relative rotation of the limiting member and the first driving assembly.

8. The speaker structure according to claim 7, wherein the first driving assembly comprises a first driving motor, a gear assembly and a lead screw, the first driving motor is arranged in parallel to the lead screw, the gear assembly is connected to respective ends of the first driving motor and the lead screw, and the limiting member is arranged around the lead screw.

9. The speaker structure according to claim 7, wherein the main speaker further comprises a first light blocking member, a first control panel, a first position sensor, a second position sensor and a third position sensor, the first position sensor, the second position sensor and the third position sensor are arranged on the first control panel, the first light blocking member is fixedly connected to the limiting member, the first control panel is fixedly installed on the main housing, the first position sensor, the second position sensor and the third position sensor are spaced apart from each other in the first direction, each of the first position sensor and the second position sensor cooperates with the first light blocking member to limit an extreme position of the support, and the third position sensor is arranged between the first position sensor and the second position sensor and adjacent to the second position sensor.

10. The speaker structure according to claim 7, wherein the auxiliary speaker comprises an auxiliary housing and a sound emission unit, the auxiliary housing defines an auxiliary cavity, the sound emission unit of the auxiliary speaker is arranged in the auxiliary cavity, the second driving mechanism comprises a second driving motor and a gear-rack assembly, the second driving motor is arranged in the main cavity, an output end of the second driving motor extends into the auxiliary cavity and is connected to the gear-rack assembly, and a rack in the gear-rack assembly is arranged in the second direction.

11. The speaker structure according to claim 10, wherein the auxiliary speaker further comprises at least three sets of guide assemblies, the at least three sets of guide assemblies are arranged in the auxiliary cavity, arranged in a length direction of the auxiliary cavity and uniformly spaced apart from each other.

12. A display device, comprising a display screen, and further comprising a speaker structure, wherein the speaker structure comprises:
a main speaker;
an auxiliary speaker connected to the main speaker and displaceable relative to the main speaker;
a first driving mechanism configured to simultaneously drive the main speaker and the auxiliary speaker to reciprocate in a first direction; and
a second driving mechanism configured to drive the auxiliary speaker to reciprocate in a second direction relative to the main speaker, wherein the first driving mechanism is arranged in the main speaker, the second driving mechanism is arranged in the main speaker, and an output end of the second driving mechanism extends out of the main speaker and is connected to the auxiliary speaker, and
wherein a receiving cavity is formed in a rear surface of the display screen, the speaker structure is installed in the receiving cavity, a first driving mechanism drives a main speaker and an auxiliary speaker of the speaker structure to reciprocate in a vertical direction, and a second driving mechanism drives the auxiliary speaker of the speaker structure to reciprocate in a horizontal direction.

13. The display device according to claim 12, wherein the first direction is a vertical direction, and the second direction is a horizontal direction.

14. The display device according to claim 12, wherein the first driving mechanism is arranged in parallel to the second driving mechanism.

15. The display device according to claim 12, wherein the main speaker comprises a main housing and a sound emission unit, the main housing defines a main cavity, and the sound emission unit of the main speaker is arranged in the main cavity.

16. The display device according to claim 13, wherein the main speaker comprises a main housing and a sound emission unit, the main housing defines a main cavity, and the sound emission unit of the main speaker is arranged in the main cavity.

17. The display device according to claim 14, wherein the main speaker comprises a main housing and a sound emission unit, the main housing defines a main cavity, and the sound emission unit of the main speaker is arranged in the main cavity.

18. The display device according to claim 15, wherein the main speaker further comprises a support provided with a limiting groove oriented in the first direction, the support is fixedly installed in the main housing and forms an installation cavity with the main housing, the first driving mechanism comprises a limiting member and a first driving assembly, one side of the limiting member passes through the main housing and is fixedly installed to the main housing, another side of the limiting member is provided with a protrusion matched with the limiting groove, the first driving assembly is installed in the installation cavity, the first driving assembly is arranged in the first direction and is configured to output a rotary movement, the limiting member is installed at an output end of the first driving assembly, and the limiting member is movable along the limiting groove relative to the support through a relative rotation of the limiting member and the first driving assembly.

19. The display device according to claim 18, wherein the first driving assembly comprises a first driving motor, a gear assembly and a lead screw, the first driving motor is arranged in parallel to the lead screw, the gear assembly is connected to respective ends of the first driving motor and the lead screw, and the limiting member is arranged around the lead screw.

20. The display device according to claim 18, wherein the main speaker further comprises a first light blocking member, a first control panel, a first position sensor, a second position sensor and a third position sensor, the first position sensor, the second position sensor and the third position sensor are arranged on the first control panel, the first light blocking member is fixedly connected to the limiting member, the first control panel is fixedly installed on the main housing, the first position sensor, the second position sensor and the third position sensor are spaced apart from each other in the first direction, each of the first position sensor and the second position sensor cooperates with the first light blocking member to limit an extreme position of the support, and the third position sensor is arranged between the first position sensor and the second position sensor and adjacent to the second position sensor.

\* \* \* \* \*